United States Patent
Thomas et al.

(10) Patent No.: US 9,912,275 B2
(45) Date of Patent: Mar. 6, 2018

(54) NORMALIZATION OF MOTOR PHASE MEASUREMENTS

(71) Applicant: TEXAS INSTRUMENTS INCORPORATED, Dallas, TX (US)

(72) Inventors: Eric James Thomas, Ann Arbor, MI (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/250,337

(22) Filed: Aug. 29, 2016

(65) Prior Publication Data
US 2016/0373042 A1 Dec. 22, 2016

Related U.S. Application Data

(63) Continuation of application No. 14/721,823, filed on May 26, 2015, now Pat. No. 9,431,945.

(51) Int. Cl.
*H02P 21/00* (2016.01)
*H02P 21/18* (2016.01)
(Continued)

(52) U.S. Cl.
CPC .......... *H02P 21/18* (2016.02); *H02P 21/0025* (2013.01); *H02P 21/06* (2013.01);
(Continued)

(58) Field of Classification Search
CPC .......... H02P 27/04; H02P 27/06; H02P 21/00; H02P 21/04; H02P 6/00; H02P 6/04

USPC ....... 318/400.01, 400.02, 560, 650, 652, 55, 318/700, 400.04, 400.07, 400.12, 400.14, 318/400.15, 400.32, 701, 715, 721, 725, 318/727, 799, 800, 801, 805, 807, 808, 318/809, 812, 254.1, 430, 432, 437, 490, 318/504, 400.21, 400.22, 779; 388/847, 388/907.5

See application file for complete search history.

(56) References Cited

U.S. PATENT DOCUMENTS

6,208,110 B1  3/2001  O'Meara et al.
6,734,666 B2  5/2004  Voillat
(Continued)

*Primary Examiner* — Antony M Paul
(74) *Attorney, Agent, or Firm* — John R. Pessetto; Charles A. Brill; Frank D. Cimino (57) ABSTRACT

A method of normalizing phase measurements for a motor using a normalizing phase measurements (NPM) algorithm that a processor implements to cause a motor controller coupled to stator terminals of the phases to execute forcing a set of input current or voltage vectors (set of input vectors) including repeating the forcing after rotating the rotor through a full mechanical cycle to generate resulting current or voltage samples (resulting samples) of non-normalized phase A and phase B waveforms. The magnitude of the input vectors are sufficiently small to not move the rotor. A maximum value (x_max) and a minimum value (x_min) are determined for each of the non-normalized phase A and phase B waveforms. An offset value and normalization scale factor (NSF) are determined from the max and min values. The offsets and NSFs are applied to the non-normalized phase waveforms to generate normalized phase A and phase B waveforms.

8 Claims, 6 Drawing Sheets

Related U.S. Application Data

(60) Provisional application No. 62/054,502, filed on Sep. 24, 2014.

(51) Int. Cl.
  *H02P 21/06* (2016.01)
  *H02P 21/24* (2016.01)
  *H02P 25/03* (2016.01)
  *H02P 25/08* (2016.01)
  *H02P 27/08* (2006.01)

(52) U.S. Cl.
  CPC .............. *H02P 21/24* (2016.02); *H02P 25/03* (2016.02); *H02P 25/08* (2013.01); *H02P 27/08* (2013.01)

(56) References Cited

U.S. PATENT DOCUMENTS

| | | |
|---|---|---|
| 8,179,065 B2 | 5/2012 | Matsuo |
| 8,536,811 B2 * | 9/2013 | Wrobel .................... H02P 1/28 318/400.11 |
| 8,674,638 B2 | 3/2014 | Balazovic et al. |
| 9,431,945 B2 * | 8/2016 | Thomas .............. H02P 21/0025 |
| 2013/0030731 A1 * | 1/2013 | Seki ........................ B60R 16/03 702/60 |

* cited by examiner

NORMALIZATION OF MOTOR PHASE MEASUREMENTS

CROSS REFERENCE TO RELATED APPLICATIONS

This application is a Continuation of prior application Ser. No. 14/721,823, filed May 26, 2015, currently pending; And also claims the benefit of Provisional Application Ser. No. 62/054,502 entitled "NORMALIZATION OF MOTOR PHASE MEASUREMENTS" filed Sep. 24, 2014, which is herein incorporated by reference in its entirety.

FIELD

Disclosed embodiments relate to calibrating phase measurements from a multi-phase motor to account for imbalances for use by a motor controller.

BACKGROUND

An electric motor is a machine that converts electrical energy into mechanical energy. Electric motors include DC motors and AC motors. One type of AC motor is an AC induction motor. An AC induction motor is typically driven by 3-phase alternating current provided by an electric motor controller coupled to a 3-phase inverter. The AC motor includes an outside stationary stator having coils supplied with alternating current to produce a rotating magnetic field, which induces a current in the rotor windings. As the current flows through the rotor windings, a second magnetic field is generated which interacts with the magnetic field from the stator to produce motion. The rotor is attached to the output shaft that is given a torque by the rotating magnetic field. The interaction of the rotor field and the stator field causes rotation of the rotor which can be used to perform work.

Another type of AC motor is a permanent magnet motor (PMM). PMMs have permanent magnets located on the rotor and copper windings located on the stator. The alternating current in the stator windings produces a rotating magnetic field which interacts with the magnetic field from the rotor magnets to produce motion. The frequency at which the stator current oscillates determines the rotor's angular velocity and the resulting angular position.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include methods for determining an offset value and normalization scale factor (NSF) for each phase of an N-phase motor for normalizing the stator winding current or voltage phase measurements using a normalizing phase measurements (NPM) algorithm which accounts for voltage or current imbalances in the respective phases. Such imbalances can result from differences in the respective inverter and the stator winding phases. The NSFs are found by rotating the input vector (current or voltage) with discrete steps (e.g., 10 or 15 degrees) through at least one electrical rotation to obtain phase waveforms, or in one embodiment through at least one mechanical rotation (where $\theta_e = Npp \cdot \theta_m$, where $\theta_e$ is the electrical angle, $\theta_m$ is the mechanical angle, and Npp is the number of pole pairs ($\geq 1$) in the motor) which enables determining the offset value and maximum value (x_max) and minimum value (x_min) of each waveform. Each waveform has its own x_min and x_max_value, coming from the un-normalized waveforms. After normalization as described below, the new normalized waveforms have the same maximum and minimum values.

The offset value as used herein is the min value as the smallest value for the range of sampled data because the smallest value is greater than zero (e.g., 0.30 or 0.42), and after normalization the smallest value can become zero (0), with a maximum value of one (1) after normalization. The NSF for each waveform can be found by computing 1/(x_max−x_min), and then the respective waveforms are normalized by applying a disclosed normalization equation that includes the NSF. The variation between phases is reduced by normalizing using x_min and x_max measurements within a waveform because after normalization all values for a given waveform go between the same range (e.g., 0 and 1).

The offset and NSF are applied to the sampled values from each phase waveform at each sample instant to produce normalized waveforms. Once the waveforms are normalized to the same range (such as 0 to 1), the waveforms can be used to perform balanced FOC control of the motor or to compute the initial rotor angular position. The mismatch between the waveforms is recognized to result in tracking performance errors in FOC control or in calculation error in initial rotor angular position estimation. However, since operation is possible in phase coordinates, the need for FOC is removed.

Figure 6:
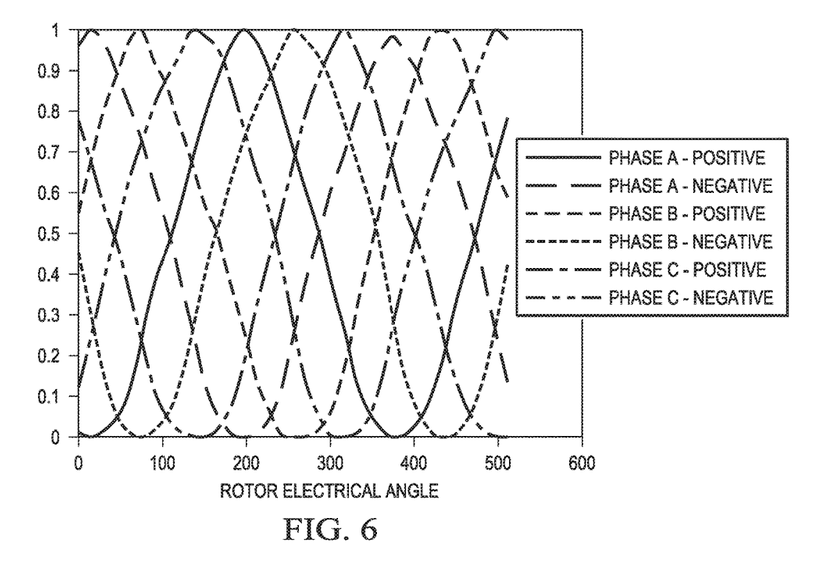
FIG. 6 shows experimental results from applying a disclosed normalization algorithm to a surface mounted PMM, showing the calibrated stator current response for each stator winding phase as a function of rotor electrical angle at 10 degree increments.

The respective phase measurements after disclosed normalization have essentially the same mean value, same maximum value (e.g., 1) and same minimum value (e.g., 0) (see the normalized waveforms shown in FIG. 6 described in the Examples below) so that the resulting normalized waveforms for the respective phases are essentially symmetrical. By providing symmetrical waveforms from the respective phases of the motor, disclosed NPM algorithms enable higher performance motor estimation algorithms such as initial rotor angular position ($\theta$) detection which depend on the symmetry of the input data from the phases to the motor controller.

Disclosed embodiments include motor controllers implementing current and/or voltage sensed control for controlling N-phase motors that include a disclosed motor control system, an estimator (EST) system and a NPM system. The NPM system includes a controller (NPM controller) block that determines the state of the normalization system and the resulting input signals used for generating a voltage or current input vector set coupled to the stator terminals of the motor. The NPM controller commands the signal sequence to the signal generator (SIG GEN) block for a given angle value and gives an angle value to an EST block and the SIG GEN block provides signals used for generating a voltage or current input vector set coupled to the stator terminals of the motor, the EST block implements an initial angular position estimation algorithm, and velocity estimation algorithm.

The control scheme utilized with disclosed NPM algorithms can be field oriented control (FOC). However, as noted above, disclosed NPM algorithms are independent of the control system as they can be operate in fixed coordinates which removes the need for FOC. Other control schemes that can be used include the motor controller operating in the $\alpha/\beta$ frame, where the voltage/current in each coordinate is independently controlled and then transformed via Space Vector Generator (SVG), which converts the desired voltage vector ($V\alpha\beta$) into pulse width modulation (PWM) time durations to generate motor phase voltages (Vabc) or currents Iabc to give the desired voltage or current level. The motor controller can also operate in the A/B/C frame to allow control of the voltage/current of each motor phase directly.

BRIEF DESCRIPTION OF THE DRAWINGS

Reference will now be made to the accompanying drawings, which are not necessarily drawn to scale, wherein.

DETAILED DESCRIPTION

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 1:
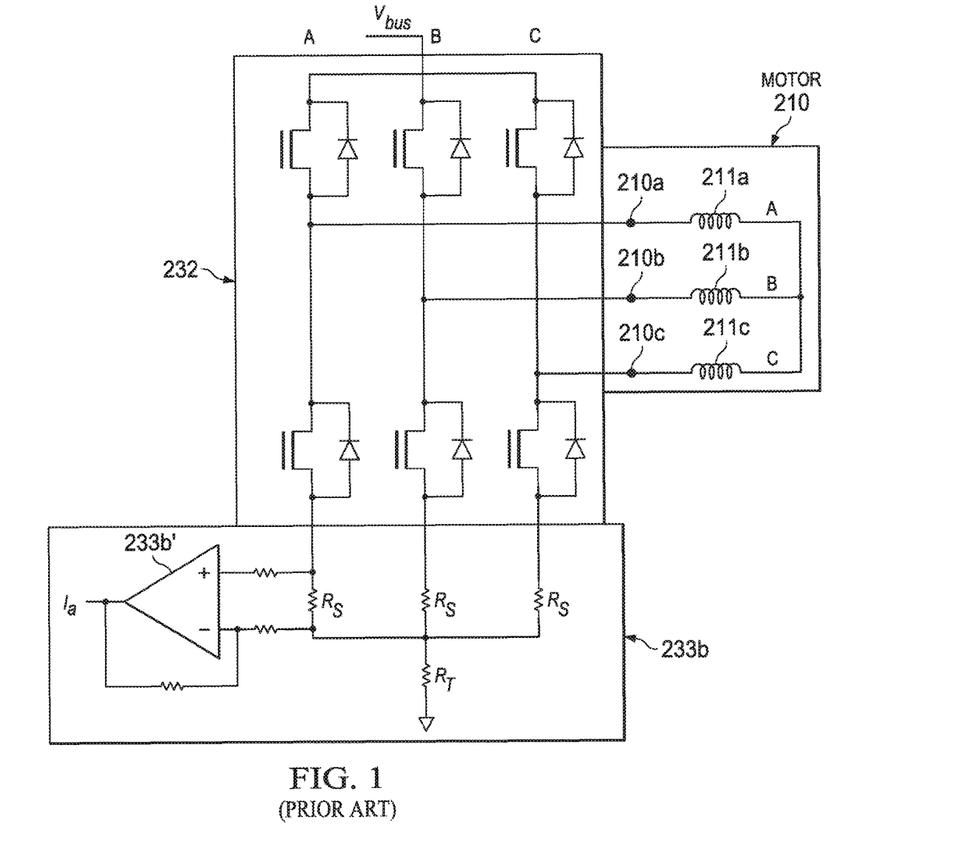
FIG. 1 depicts a current sampling circuit and a 3-phase motor coupled by a 3-phase inverter to stator terminals of stator windings of the motor for a voltage controlled motor system provided to explain how the current in the stator windings can be inadvertently biased by differences in the respective phases of the 3-phase inverter as well as differences in the stator windings.

Before the NPM algorithms are developed, the origin of phase imbalances will be described. FIG. 1 depicts a current sampling circuit 233b for a 3-phase motor 210 having phases A, B and C coupled by a 3-phase inverter 232 to stator terminals 210a, 210b, and 210c of stator windings 211a, 211b, 211c of the motor 210 for a voltage controlled motor system provided to explain how the current in the stator windings can be inadvertently biased by differences in the respective phases of the 3-phase inverter 232 and in the stator windings 211a, 211b, 211c. The 3-phase inverter 232 comprises first and second series connected power metal-oxide-semiconductor field-effect transistor (MOSFET) switches for each phase and the current sampling circuit 233b includes an operational amplifier 233b' for sampling the stator current in each phase. As known in the art, although not shown, the gates of the MOSFET switches for each phase receive pulse width modulation (PWM) signals from a PWM driver and power driver combination which turn the MOSFET switches ON and OFF.

The current sampling circuit 233b includes sense resistors, shown as $R_s$, which is placed in series with each phase-to-phase terminal of the motor 210 so that the operational amplifier 233b' applies a gain to the voltage developed across $R_s$, and an analog-to-digital converter (ADC) (not shown in FIG. 1, but see ADC 243b in FIG. 2 described below) digitizes the result to enable measuring the amplified voltage. Knowing the $R_s$ value, the corresponding instantaneous stator current value can be determined. An issue arises because the resistance values of each phase (sum of the value of $R_s$ plus the motor phase resistance) and the voltage across each motor phase generated by the MOSFET for a given PWM command are different from phase to phase, that disclosed embodiments compensate for these effects and create a balanced 3-phase inverter 232 plus motor 210 system. That is, for the same PWM command to the control nodes (e.g., gates) of the inverter, the measurement current level in each motor phase (A, B and C) is adjusted to be essentially the same value after running the NPM algorithm.

An example NPM system is now derived using phase voltage values to the stator terminals of a 3-phase motor as inputs and the resulting stator phase current values as used as outputs. As noted above, current mode control may alternatively be used. In the current mode control embodiment, desired phase current values are used as inputs, again chosen to satisfy the system constraint that the rotor does not move during initial position detection, with resulting stator phase voltage values used as outputs.

Since many different voltage input sequences can be used, a set of input voltage vectors is chosen that satisfies the system constraint that the rotor does not move during initial position detection. An example input voltage sequence chosen for a 3-phase motor can contain two sets of orthogonal phase vectors, one set is the fundamental positive magnitude phase vector set and one is the fundamental negative magnitude phase vector set, which for 3 phases shown as a, b and c can be written as:

Positive Mag Vector Set:

$$\begin{bmatrix} V_a \\ V_b \\ V_c \end{bmatrix} = \begin{bmatrix} v_a \\ 0 \\ 0 \end{bmatrix} \quad \begin{bmatrix} V_a \\ V_b \\ V_c \end{bmatrix} = \begin{bmatrix} 0 \\ v_b \\ 0 \end{bmatrix} \quad \begin{bmatrix} V_a \\ V_b \\ V_c \end{bmatrix} = \begin{bmatrix} 0 \\ 0 \\ v_c \end{bmatrix}$$

Negative Mag Vector Set:

$$\begin{bmatrix} V_a \\ V_b \\ V_c \end{bmatrix} = \begin{bmatrix} -v_a \\ 0 \\ 0 \end{bmatrix} \quad \begin{bmatrix} V_a \\ V_b \\ V_c \end{bmatrix} = \begin{bmatrix} 0 \\ -v_b \\ 0 \end{bmatrix} \quad \begin{bmatrix} V_a \\ V_b \\ V_c \end{bmatrix} = \begin{bmatrix} 0 \\ 0 \\ -v_c \end{bmatrix}$$

The vector sets above are fundamental as there is only one non-zero value in each vector, which simplifies the NPM algorithm. As another example, the following positive and negative vector sets can also be used.

Positive Mag Vector Set:

$$\begin{bmatrix} V_a \\ V_b \\ V_c \end{bmatrix} = \begin{bmatrix} 0 \\ -v_b \\ v_c \end{bmatrix} \quad \begin{bmatrix} V_a \\ V_b \\ V_c \end{bmatrix} = \begin{bmatrix} v_a \\ -0.5 \cdot v_b \\ -0.5 \cdot v_c \end{bmatrix}$$

Negative Mag Vector Set:

$$\begin{bmatrix} V_a \\ V_b \\ V_c \end{bmatrix} = \begin{bmatrix} 0 \\ v_b \\ -v_c \end{bmatrix} \quad \begin{bmatrix} V_a \\ V_b \\ V_c \end{bmatrix} = \begin{bmatrix} -v_a \\ 0.5 \cdot v_b \\ 0.5 \cdot v_c \end{bmatrix}$$

As there are more than one non-zero value in each vector, the vector sets shown above are not fundamental vector sets. However, the above vectors sets are only example voltage vector sets and different input voltage vector sets (or input current voltage sets) can be applied without changing the fundamental operation of the algorithm provided the system constraint that the rotor does not move during angular position detection is satisfied.

In the case of voltage forcing, by forcing the voltage vector in each input vector set for essentially the same time duration, the resulting stator current levels in each phase can be measured and recorded. Once the current values for all six applied phase vectors have been recorded (e.g., saved to memory), the disclosed NPM system commands a new angular position to the motor control system. Once the new angular position is reached, the NPM repeats the voltage sequence to obtain the phase current sample values at this angular position. This process is repeated until the NPM system has gathered phase current samples for the voltage vector sequences at all of the desired rotor angular positions.

Design parameters for disclosed NPM algorithms thus comprise the type of input voltage signals, the time duration of the voltage signals, the method for determining the x_min and x_max for each of the phase waveforms, and the method for determining the offset value and the NSF needed for each of the phase waveforms to scale the N-phase measurements ($x_1, \ldots, x_\alpha$) in the N-dimension current vector.

A significant benefit of using the disclosed six fundamental phase vectors (or more generally 2 vectors per phase) is that the current level in each phase winding can be easily controlled. By energizing only one phase at a time, better control of the magnetic interaction between the magnetic field generated by the stator windings and the magnetic field from the rotor magnets can be achieved. As a result, there is less risk of rotating the rotor.

FOC is also called vector control which is known to be a variable frequency drive (VFD) control method that applies generally to all electric motors where there is a desire to control the magnetic flux of the motor in one direction and the torque produced the motor in a second direction, which is orthogonal to the first direction. FOC can control the output of three-phase motors by using two controllable VFD inverter output variables or can control the output of brushless DC motors. However, as noted above, since disclosed NPM algorithms are independent of the control system as they can be operate in phase coordinates which enables use of other control methodologies.

Figure 2:
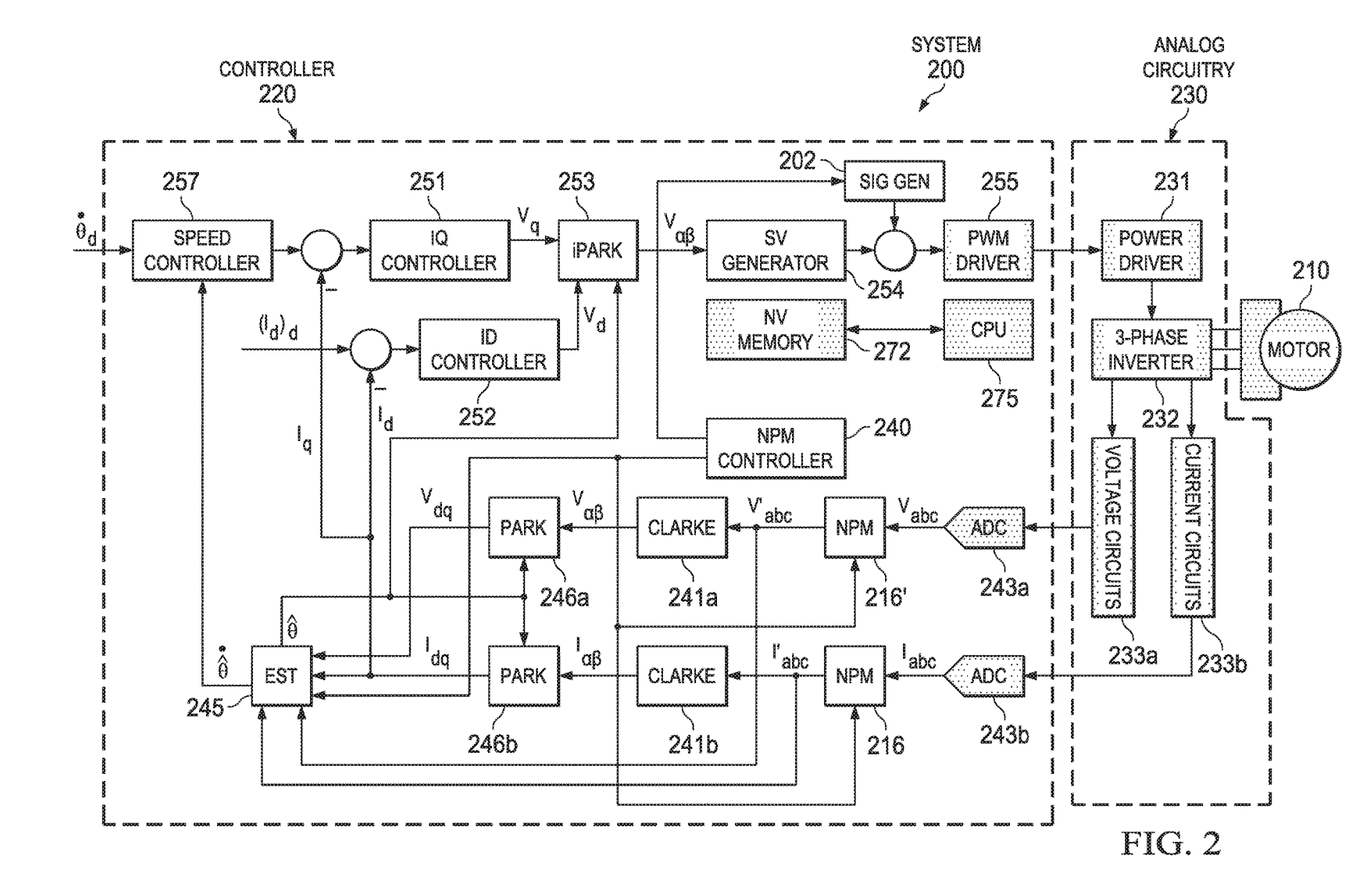
FIG. 2 depicts a block diagram depiction of a motor control system with a FOC motor controller for implementing voltage and current sensed control for controlling a three-phase motor having a disclosed NPM algorithm block, an NPM controller that determines the state of the NPM system and specifies the desired signals needed by the SIG GEN block and the NPM algorithm, a SIG GEN block that provides signals used for generating a voltage input vector set coupled to the stator terminals, and an EST block, according to an example embodiment.

FIG. 2 shows an example block diagram depiction of a controlled motor system 200 including a FOC motor controller (controller) 220 which employs current and/or voltage sensing for controlling a motor 210 shown as a three-phase motor having a disclosed NPM algorithm block 216. The NPM system includes the NPM controller block (NPM controller) 240 that determines the state of the NPM system and specifies the state to the signal generator block (SIG GEN) 202, where the SIG GEN block 202 provides signals used for generating a voltage input phase vector set coupled to the stator terminals using the 3-phase inverter 232 and the PWM driver circuitry 255. The motor 210 can be a permanent magnet (PM) motor or an AC (alternating current) induction motor. The NPM controller 240 sends signals to the SIG GEN block 202 that together with Tabc function to rotate the motor 210 thru one at least one mechanical cycle (mechanical revolution of the motor) via discrete steps.

Controller 220 includes a non-volatile (NV) memory 272, such as read only memory (ROM) or static random access memory (SRAM), and a processor shown as a central processing unit (CPU) 275 that implements in software all the blocks in the unshaded (non-dotted) blocks shown in FIG. 2. Hardware components of system 200 such as CPU 275 and NV memory 272 are shown in dotted blocks to distinguish them from components of system 200 implemented in software.

The output of SIG GEN block 202 is added with the Tabc output of the SV generator 254 which is used as the input of the PWM driver 255. The SIG GEN block 202 receives a desired phase voltage command from the NPM controller 240. The signals provided by SIG GEN block 202 controls the amplitude and duration of the input waveforms (here voltage waveforms) applied by the 3-phase inverter 232 to the respective stator windings of each phase of the motor 210 to enable measuring resulting stator current levels, generating an N-dimension current vector or voltage vector from the measured current or voltage levels. SIG GEN block 202 is synchronized with the EST block 215 by the NPM controller 240 telling the EST block 215 which state it is in.

System 200 also includes analog circuitry 230 between the controller 220 and the motor 210 comprising power driver 231, 3-phase inverter 232, and current measurement circuits 233b. The controller 220 includes analog-to-digital converters (ADC's) 243b coupled to receive outputs from the current measurement circuits 233b shown as "current circuits", and a PWM driver 255 for driving the power driver 231.

The controller 220 can be a sensorless controller or can be a controller having a voltage or current sensor. FOC controllers having sensors can include encoders and sensors that measure position directly and then estimate the angular speed therefrom. Controller 220 can be implemented by a MCU, such as the MCU chip 300 shown in FIG. 3 described below. Circuitry other than a MCU can also be used to realize controller 220 implementing a disclosed NPM controller block 240, an EST block 215 and a SIG GEN block 202 algorithm, such as coprocessors or accelerators built using application-specific integrated circuit (ASIC) logic gates or field programmable gate arrays (FPGAs).

The ADC's 243b output phase currents shown as Iabc that is coupled to the input of NPM algorithm block 216 which outputs normalized current measurements for the respective phases I'abc to an input of the EST block 215. An example normalization equation the NPM algorithm block 216 can implement is shown below:

$$x\_norm[n]=(x[n]-x\_min)*(1/(x\_max-x\_min)).$$

wherein x is current or voltage, said x_norm[n] is a normalized sample value for the normalized waveform at discrete-time instant n; x[n] is a level of the resulting non-normalized sample at n, and (1/(x_max−x_min) is the NSF. The discrete time index n utilized in the normalization equation means normalization is run on each sample of the current or voltage waveform. The above equation is hereafter in this detailed description referred to as an "example NPM equation". The EST block 215 generates for each phase current an angular position estimate $\hat{\theta}$ and angular velocity estimate $\dot{\theta}$. The $\dot{\theta}$ with a dot (.) above denote estimate angular velocity which is provided by θ EST block 215 to the speed controller 257 shown.

The normalized current measurements for the respective phases I'abc is also shown coupled to an input of the Clarke block 241b which performs the known Clarke transformation which takes the measured current in the abc frame and transforms it into the α/β coordinate system to generate Iαβ, which is coupled to an input of the Park block 246b. Park block 246b performs the known Park transformation to provide outputs Idq being measured phase current values from the stator terminals of the motor 210 which are added to the input of the ID current controller 252 and to the input of the IQ current controller 251 as shown in FIG. 2. The estimated angular position is shown coupled to an inverse Park (iPARK) block 253 which receives the Vq output from IQ controller 251 and the Vd output from the ID controller 252 as other inputs.

The EST block 215 is coupled to the iPARK block 253, which outputs Vαβ which is coupled to SV generator block 254, where the output of SV generator block 254 is coupled to PWM driver 255. The SV generator 254 computes the PWM time durations for each phase of the motor 210 to produce the desired Vαβ voltage values. The output of the PWM driver 255 is coupled to an input of a power driver 231 that has an output coupled to drive an input of the 3-phase inverter 232. In this voltage mode control embodiment, the 3-phase inverter 232 forces voltage onto the stator terminals associated with each of the three phases of motor 210.

The controller 220 also can have the EST block 215 receive a V'abc input that is generated by the voltage measurement circuits (voltage circuits) 233a coupled to an output of the 3-phase inverter 232. The output from voltage circuits 233a is coupled to ADC 243a which generates Vabc that is coupled to an NPM algorithm block 216' which outputs normalized voltage measurements V'abc that are coupled to the EST block 215 and to the Clark block 241a, which outputs Vαβ to Park block 246a. The Vdq output of Park block 246a is coupled to an input of the EST block 215.

Figure 3:
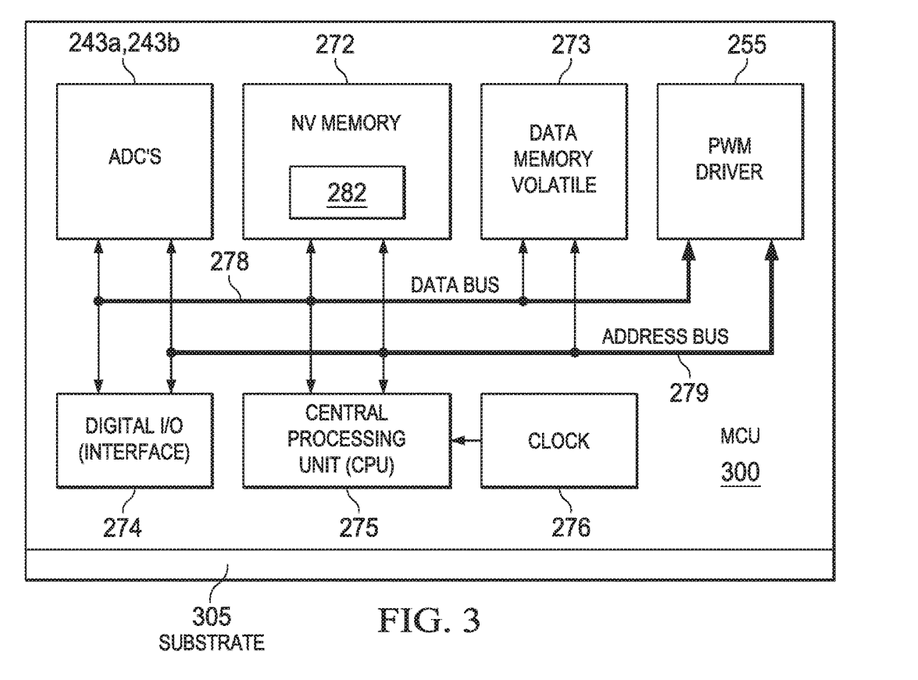
FIG. 3 is a block diagram depiction of an example microcontroller unit (MCU) chip implementing the motor controller shown in FIG. 2, according to an example embodiment.

FIG. 3 is a block diagram depiction of an example MCU chip 300 formed on a substrate 305 implementing the controller 220 shown in FIG. 2 including the EST block 215, NPM controller 240, NPM algorithm block(s) 216 and SIG GEN block 202, according to an example embodiment. Although not shown, the MCU chip 300 generally includes other integrated circuit modules, for example, a Universal Serial Bus (USB) controller and a transceiver. MCU chip 300 is shown including NV memory 272, volatile data memory 273, digital I/O (interface) 274, CPU 275, and clock (or timer) 276. Core for implementing the EST block 215, NPM controller 240, NPM algorithm block(s) 216 and SIG GEN block 202 is shown collectively as 282 stored in NV memory 272, although it is possible one or more of these blocks or the controller can be implemented in hardware. MCU chip 300 is also shown including a digital data bus 278 and an address bus 279.

MCU chip 300 is shown as a monolithic integrated circuit (IC). The substrate 305 may comprise silicon, such as bulk silicon or silicon epi on a bulk silicon substrate. The substrate 305 may also generally comprise other materials, such as elementary semiconductors besides silicon including germanium. Substrate 305 may also generally comprise a compound semiconductor.

Benefits of disclosed NPM algorithms include a method to normalize phase measurements so that after normalization they have the essentially same mean value, maximum value (e.g., 1) and minimum value (e.g., 0), where the resulting waveforms are essentially symmetrical. Symmetric waveforms from the respective phases enables higher accuracy motor estimation algorithms such as initial angle estimation that depend on symmetry of their input data. It is recognized if the phase waveforms are not normalized, there is a relative offset scaling and magnitude scaling that is missing and as a result the calculated rotor angles will be in error. As noted above, disclosed NPM algorithms can be implemented using current or voltage phase measurements. Applications include motor controller for position control, velocity control or current/torque control of the motor.

Disclosed algorithms can be implemented for normalizing phase measurements for a variety of motor controllers, for example for the Texas Instruments' INSTASPIN-FOC sensorless motor control technology, such as for PICCOLO and POTENZA MCU chip-based motor controllers. The normalizing phase measurements can be used for position control, velocity control or current/torque control of the motor. In the case of INSTASPIN-FOC technology and related technology, code for the disclosed NPM algorithms can be embedded in the ROM of the MCU chip (see NV memory 272 in FIG. 3), such as to accelerate motor control development while improving efficiency. Motor control applications include for washing machines, compressors, pumps, fans, electric bicycles, tools, treadmills, compact drives, sewing and textile machines, lifts and hobby motors.

Figure 4A:
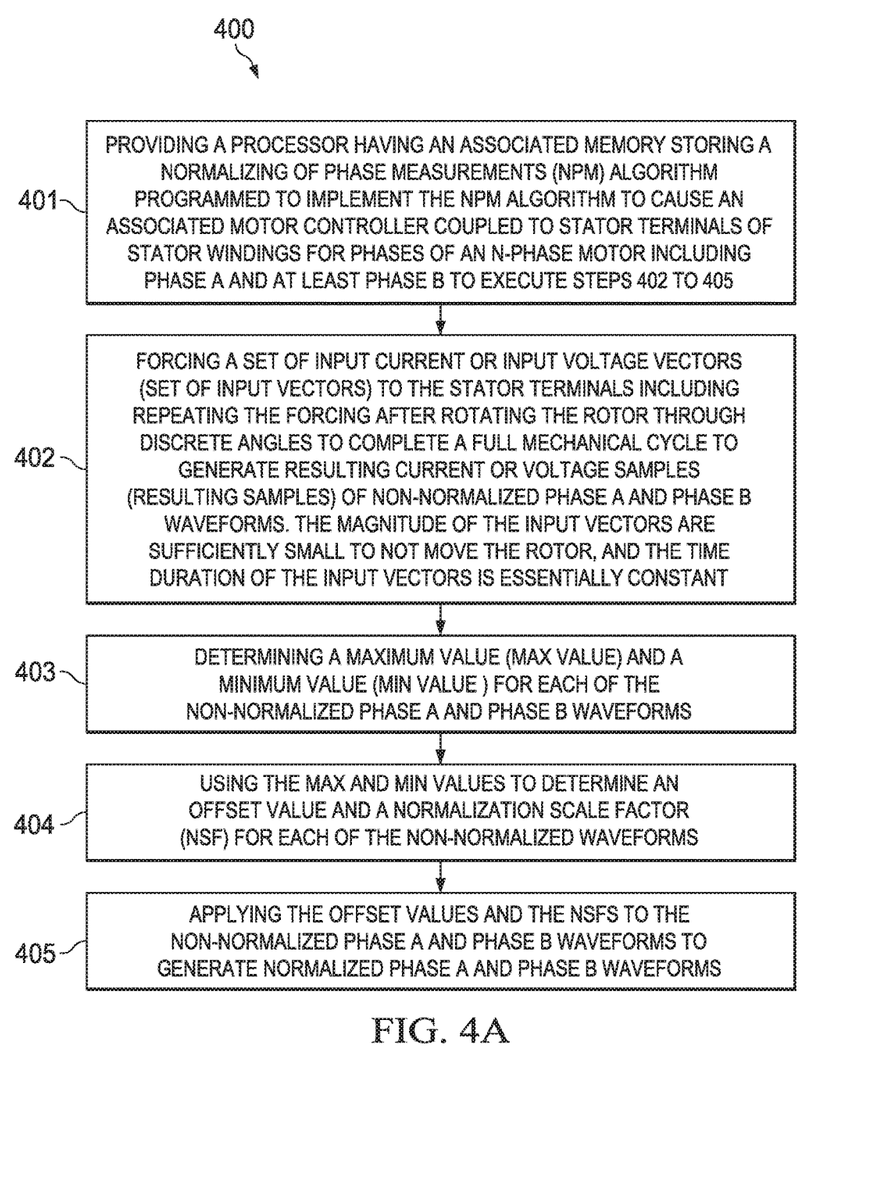
FIG. 4A shows steps in an example method of normalizing motor phase measurements for an N-phase motor using an NPM algorithm, according to an example embodiment.

FIG. 4A shows steps in an example method 400 of normalizing motor phase measurements for an N-phase motor using an NPM algorithm, according to an example embodiment. Step 401 comprises providing a processor having an associated memory storing a disclosed NPM algorithm programmed to implement the NPM algorithm to cause an associated motor controller coupled to stator terminals of stator windings for phases of the motor including phase A and at least phase B to execute steps 402 to 405 shown below. Typically the motor will be a 3-phase motor with its phases referred to as A, B and C.

Step 402 comprises forcing a set of input current or input voltage vectors (set of input vectors) to the stator terminals including repeating the forcing after rotating the rotor through discrete angles to complete a full mechanical cycle to generate resulting current or voltage samples (resulting samples) of non-normalized phase A and phase B waveforms. The magnitude of the input vectors are sufficiently small to not move the rotor, and the time duration of the input vectors is essentially the same time duration from a programming perspective setting them all to the same value, with switching differences in the respective paths causing small differences in the time durations.

A maximum value (x_max) and a minimum value (x_min) is determined in step 403 for each of the non-normalized phase A and phase B waveforms, and step 404 comprises using the x_max_and x_min values for each of the non-normalized waveforms to determine an offset value and a NSF for each of the non-normalized waveforms. Step 405 comprises applying the offset values and the NSFs to the non-normalized phase A and phase B waveforms to generate normalized phase A and phase B waveforms. A magnitude and offset difference between the normalized phase A and normalized phase B waveforms is reduced as compared to a magnitude difference between the non-normalized waveforms. The normalized phase waveforms can be used as controller inputs for use with an angular position determination (APD) equation to determine an initial rotor position.

Figure 4B:
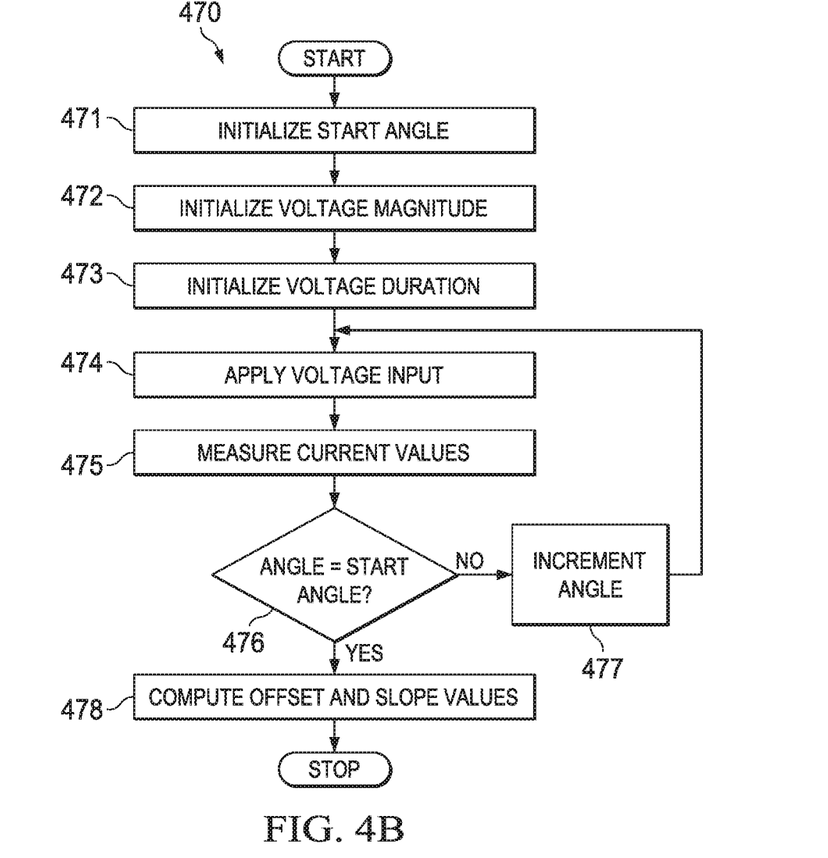
FIG. 4B shows the steps in an example calibration process for adjusting the voltage pulse magnitude and pulse duration as well as generating the normalization waveforms, according to an example embodiment.

FIG. 4B is an example flow chart for a method 470 relating to the above disclosed voltage pulsing and current measuring (sampling) process for one phase of an N-phase motor, described as being phase A. Disclosed NPM controllers can control the normalization process according to this flow chart. Once the rotor has been rotated by at least one mechanical cycle, which as noted above is equal to Npp electrical cycles, the offset values and NSFs can be computed as described above for each phase by the NPM modules and used to normalize new sensed current or voltage data samples. One electrical cycle is generally not sufficient, as one may not find the actual maximum value and the resulting normalized waveform could have a maximum value greater than one.

Step 471 comprises initializing a start angle which is arbitrary and can be any θ from 0 to 2π radians. Step 472 comprises initializing a voltage vector magnitude and step 473 comprises initializing a voltage duration. Step 474 comprises applying a voltage input to a stator terminal of the stator winding for phase A, and step 475 comprises measuring a resulting current value.

Step 476 is a decision block that decides whether a complete mechanical cycle has been completed by comparing the current rotor angle to the start angle. If a complete mechanical cycle has not been completed as determined in step 476, the method moves to step 477 comprising incrementing the angle (e.g., such as by 10 or 15 degrees) of the rotor and returning to step 474. If a complete mechanical cycle has been completed as determined in step 476, the method moves to step 478 comprising computing the offset and NSF values.

Any equation described herein may be implemented by either hardware or by software. Regarding hardware-based implementations, a disclosed equation can be converted to a logic gate pattern, such as using VHDL which can then be realized such as using FPGA or application-specific integrated circuit (ASIC) to implement the logic gate pattern. VHDL is an acronym which stands for VHSIC (Very High Speed Integrated Circuits) Hardware Description Language. For example, a software-based implementation can be realized using a math library provided by a conventional MCU chip.

EXAMPLES

Figure 5:
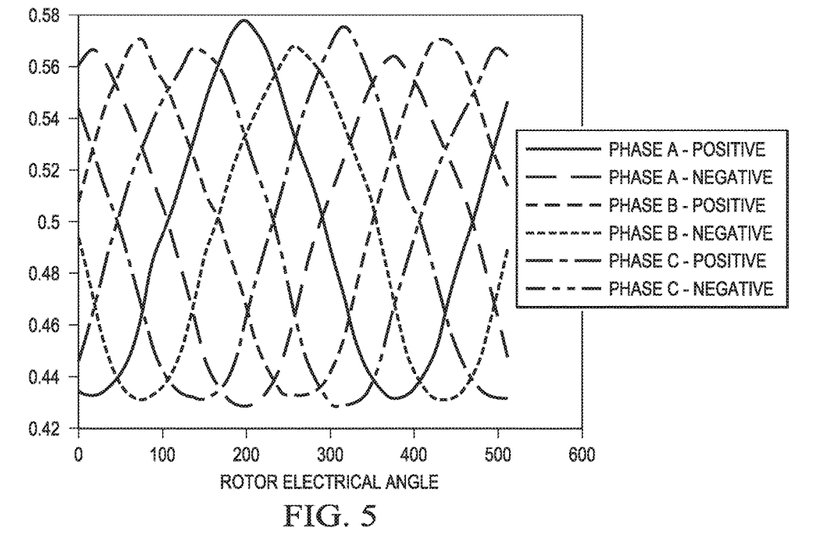
FIG. 5 shows experimental results before applying a disclosed normalization algorithm to a surface mounted PMM, showing the stator current response for each stator winding phase as a function of rotor electrical angle at 10 degree increments.

FIG. 5 shows the resulting phase current waveforms for phase A, B and C vs. angular rotor position (in degrees) using positive and negative voltage pulse sequences obtained from a typical voltage controlled 3-phase PM motor (Estun Model #EMJ-04APB22) over an angle of a little over 500 degrees (about 1.5 cycles). It can be seen the resulting positive and negative current waveforms for the respective phases (A, B and C) do not have the same mean value, the same maximum value or the same minimum value, with differences between the respective maximum and minimum values of up to about 3%. As a result, it is difficult for algorithms used in motor control to use symmetry properties across the phases, with lack of symmetry resulting in angular position error. Disclosed embodiments recognize that the current (or voltage) waveforms need to be offset corrected and normalized to render them more uniform (symmetric, to have essentially the same mean value, maximum value (e.g., 1) and minimum value (e.g., 0)) which enables improved motor controller performance.

The normalized phase current waveforms vs. rotor position obtained from normalizing the resulting phase current waveforms for phase A, B and C using the example NPM equation described above is shown in FIG. 6. After disclosed normalization, the respective phase waveforms can be seen to now all have the same mean value shown as 0.5, same maximum value (1) and same minimum value (0). The waveform for phase A Neg has a slightly lower maximum as compared to the other waveforms because of resistance asymmetries in phase windings. Since the normalized waveforms from the respective phases are symmetrical, as described above they can be used to improve performance of motor control estimation algorithms for controlling motors, such as for implementing initial rotor position detection.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of normalizing phase measurements for controlling an N-phase motor comprising:
    applying a set of input voltage vectors to stator terminals of terminal windings of the N-phase motor;
    rotating a rotor of the N-phase motor through discrete angles to complete at least one full mechanical cycle;
    wherein rotating the rotor generates voltage samples of non-normalized phase A waveforms and voltage samples of non-normalized phase B waveforms;
    wherein a magnitude of the input voltage vectors does not move the rotor;
    wherein a time duration for the input voltage vectors is constant; and
    applying the offset value and normalization scale factor (NSF) to each of the non-normalized phase A and phase B waveforms to generate a normalized phase A waveform and a normalized phase B waveform.

2. The method of claim 1 further including determining a maximum value (x_max) and a minimum value (x_min) for each of the non-normalized phase A waveforms and the non-normalized phase B waveforms.

3. The method of claim 2 further including determining the offset value and the normalization scale factor for each of the non-normalized phase A and the phase B waveforms from the maximum value and the minimum value for each of the non-normalized phase A waveforms and the non-normalized phase B waveforms.

4. The method of claim 1, wherein said at least one full mechanical cycle comprises at least one electrical cycle.

5. The method of claim 1, wherein said motor is a permanent magnet (PM) motor.

6. The method of claim 1, wherein said motor is an AC (alternating current) induction motor.

7. The method of claim 1, wherein said set of input vectors are all fundamental vectors.

8. A microcontroller unit (MCU) chip, comprising:
an analog-to-digital converter (ADC) for receiving N-phase measurements from voltage measurement circuits coupled to stator windings of a motor associated with each of said N-phases;
a pulse-width modulation (PWM) driver;
a SIG GEN block for applying a set of input voltage vectors to stator terminals of the stator;
wherein a magnitude of the input voltage vectors do not move a rotor in the motor;
wherein a time duration for the input voltage vectors is constant;
a processor for determining a maximum value (x_max) and a minimum value (x_min) for each of non-normalized phase A waveforms and for each of non-normalized phase B waveforms and using the x_max and the x_min for determining an offset value and normalization scale factor for each of the non-normalized phase A and the phase B waveforms;
wherein the processor applies the offset and the normalization scale factor to the non-normalized phase A and phase B waveforms to generate a normalized phase A waveform and a normalized phase B waveform, and
wherein the processor determines an angular position of the rotor using the normalized phase A waveform and the normalized phase B waveform.

* * * * *